United States Patent [19]
Hasegawa et al.

[11] Patent Number: 6,088,458
[45] Date of Patent: Jul. 11, 2000

[54] VIBRATION INHIBITING STRUCTURE IN DEVICE COVER

[75] Inventors: Shin Hasegawa; Kazutaka Sakaguchi; Naoto Ono, all of Wako, Japan

[73] Assignee: Honda Giken Kogyo Kabushiki Kaisha, Tokyo, Japan

[21] Appl. No.: 09/084,177

[22] Filed: May 26, 1998

[30] Foreign Application Priority Data

May 27, 1997 [JP] Japan .................... 9-136586

[51] Int. Cl.$^7$ ................ A61F 11/06; H03B 29/00

[52] U.S. Cl. ........................................ 381/71.4

[58] Field of Search ................... 381/71.1, 71.2, 381/71.4, 71.7

[56] References Cited

FOREIGN PATENT DOCUMENTS 8-244489  9/1996  Japan .

*Primary Examiner*—Minsun Oh Harvey
*Attorney, Agent, or Firm*—Nikaido, Marmelstein, Murray & Oram LLP

[57] ABSTRACT

In a device cover fastened to a casing of a vibration generating source to cover a device mounted on an outer surface of the casing, an elastic member having a natural frequency different from that of the device cover, is mounted in a mounting bore provided in the device cover which is fastened directly to the casing to close the mounting bore. Thus, the strength and durability requirements of the device cover are satisfied and moreover, the vibration of the device cover can be inhibited to reduce the resonance sound from the device cover in a simple arrangement.

2 Claims, 5 Drawing Sheets

VIBRATION INHIBITING STRUCTURE IN DEVICE COVER

BACKGROUND OF THE INVENTION

1. Field of the Invention

The present invention relates to an improvement in a vibration inhibiting structure in a device cover fastened to a casing of a vibration generating source, e.g., a transmission case for a transmission of a vehicle which covers a device mounted on the transmission case, e.g., a sensor. The structure is designed to inhibit the vibration of the device cover to reduce noise generated by the resonance of the device cover due to vibration generated in the transmission.

2. Description of the Prior Art

A structure is already known, for example, from Japanese Patent Application Laid-Open No. 8-244489, in which a sensor for detecting the rotational speed of an engine is mounted on an outer surface of a transmission case of the vehicle transmission, and a device cover covering the sensor, is fastened to the transmission case.

The device cover is fastened to the transmission case or the like to cover the sensor for the purpose of preventing damage to the sensor due to collision with a pebble, or to water-proof and heat-shield the sensor. However, if the transmission vibrates, and the device cover is resonated by the vibration from the transmission case, a resonance sound is radiated from the device cover.

To reduce the resonance sound from the device cover, it is a conventional practice to interpose an elastic material between the transmission case (casing) and the device cover, to enhance the rigidity of the device cover by increasing the thickness of the device cover or by reinforcing the device cover, to bond a damping material to the surface of the device cover by adhesive-bonding, baking and coating, and to form the device cover from a damping steel plate, thereby inhibiting the vibration of the device cover to the utmost.

However, in the structure having the elastic material interposed between the transmission case and the device cover, deterioration of the elastic material occurs due to heat from the transmission case or due to the passage of time, resulting in a problem in durability. In the technique which enhances the rigidity of the device cover, it is impossible to accommodate variations in the vibration mode on the side of the vehicle transmission which is a vibration generating source. In the structure in which the damping material is bonded and in the structure in which the device cover is formed of the damping steel plate, there is an increase in cost.

SUMMARY OF THE INVENTION

Accordingly, it is an object of the present invention to provide a vibration inhibiting structure in a device cover, wherein the strength and durability requirements are satisfied and moreover, the vibration of the device cover can be inhibited, to reduce the resonance sound from the device cover in a simple arrangement made at a lower cost.

To achieve the above object, according to the present invention, there is provided a vibration inhibiting structure for a device cover which is fastened to a casing of a vibration generating source for covering a device mounted on an outer surface of the casing. The vibration inhibiting structure comprises at least one elastic member having a natural frequency different from a resonant frequency of the device cover, and at least one mounting bore formed in said device cover, wherein the elastic member is mounted in the mounting bore to close the mounting bore, and the device cover is fastened directly to the casing.

With this arrangement, the vibration of the device cover at the particular position at which the mounting bore is provided, is inhibited by the fact that the elastic member is mounted in the mounting bore provided in the device cover to close the mounting bore. The device cover may be fastened directly to the casing without an elastic material such as rubber interposed between the device cover and the casing of the vibration generating source. Therefore, a problem cannot arise in durability of the device cover, and the strength and durability of the device cover can be enhanced by enhancing the rigidity of the device cover itself.

According to another aspect and feature of the present invention, the mounting bore is provided at a position on the casing, where a vibration level is higher than that at other sites, on the basis of a vibration frequency which is determined as being of a sound level which should be reduced, based on noise measurement when the device cover is mounted directly to the casing. Thus, the resonance in the entire device cover is effectively reduced.

The above and other objects, features and advantages of the invention will become apparent from the following description of the preferred embodiment taken in conjunction with the accompanying drawings.

BRIEF DESCRIPTION OF THE DRAWINGS

FIGS. 1 to 5 show an embodiment of the present invention, wherein

FIG. 1 is a partial side view of a transmission for a vehicle.

FIG. 2 is a sectional view taken along a line 2—2 in FIG. 1.

FIG. 3 is a side view of a device cover.

FIG. 4 is a diagram showing a frequency-vibration sound characteristic.

FIG. 5 is a diagram of a simulation for the vibration of the device cover.

DETAILED DESCRIPTION OF THE PREFERRED EMBODIMENT

Figure 1:
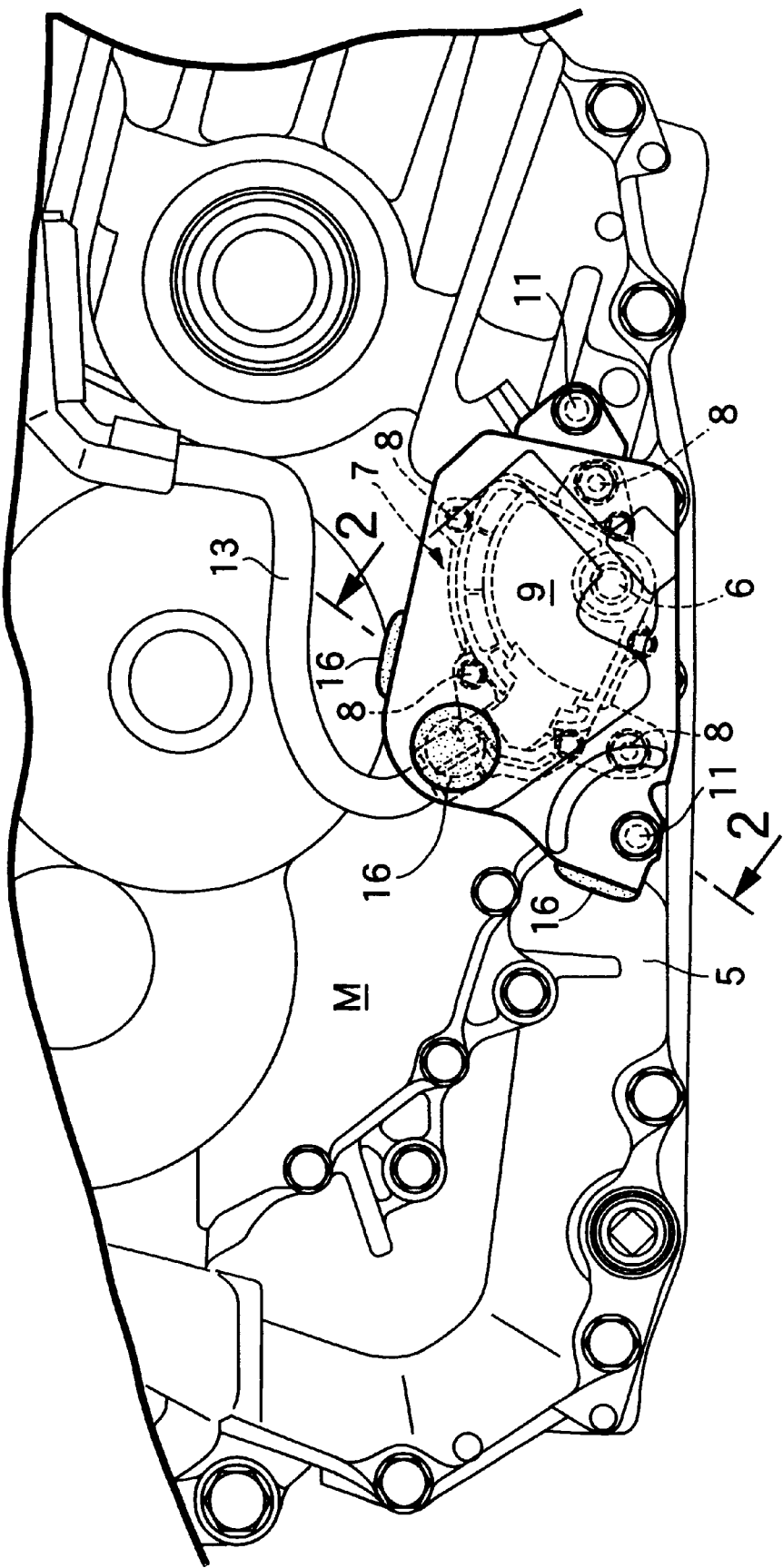
Figure 2:
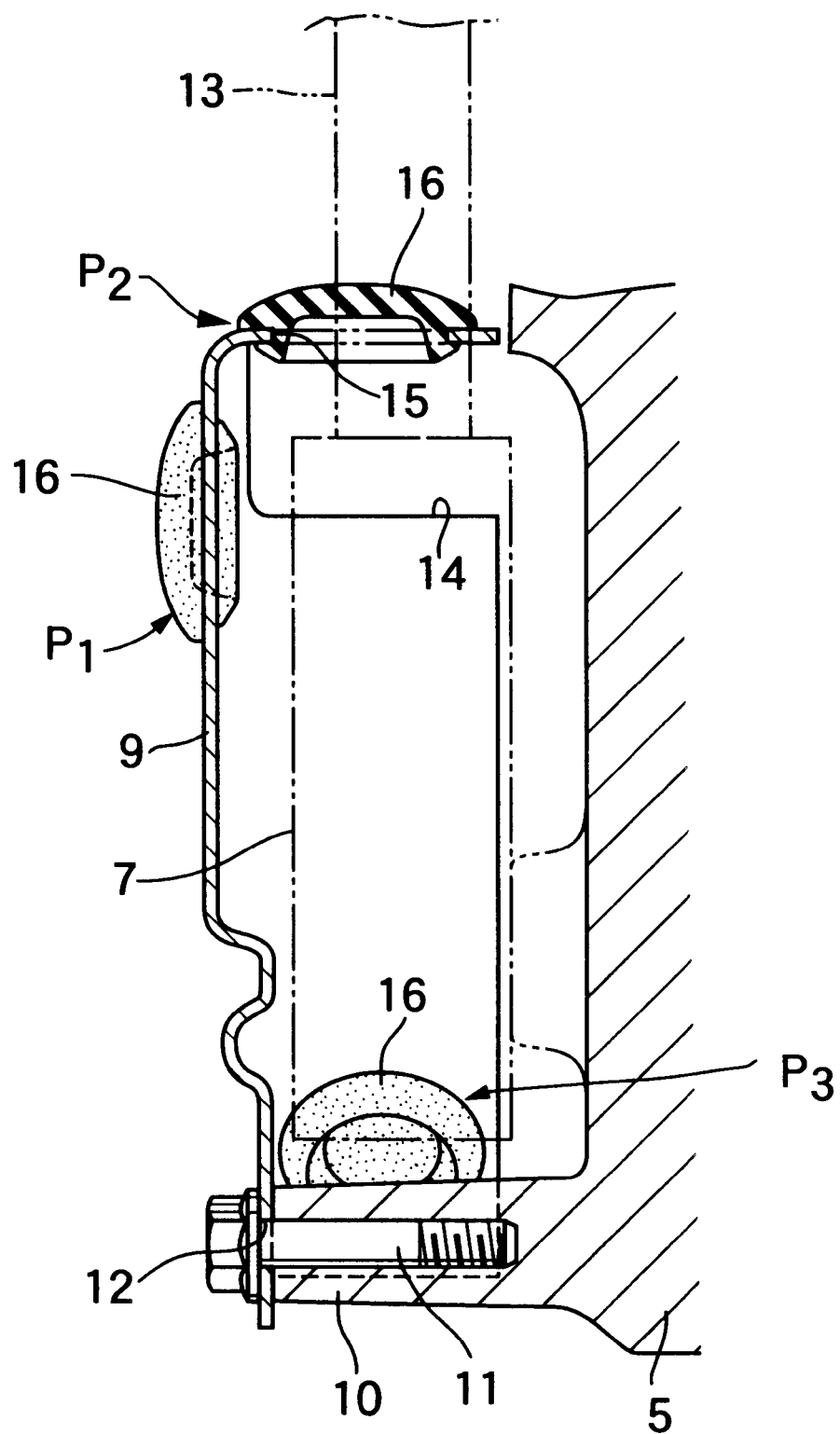

The present invention will now be described by way of a particular embodiment with reference to the accompanying drawings. Referring first to FIGS. 1 and 2, a shaft 6 to be detected, is rotatably carried in a transmission case 5 which is a casing for a vehicle transmission M, which is a vibration generating source. One end of the shaft 6 protrudes outside the transmission case 5. The shaft 6 is rotated in response with a change in the gear shift stage in the vehicle transmission M. A position sensor 7, connected to the one end of the detected shaft 6, is fastened to an outer surface of the transmission case 5 by a plurality of screw members 8. The position sensor 7 detects a gear shift stage.

Figure 3:
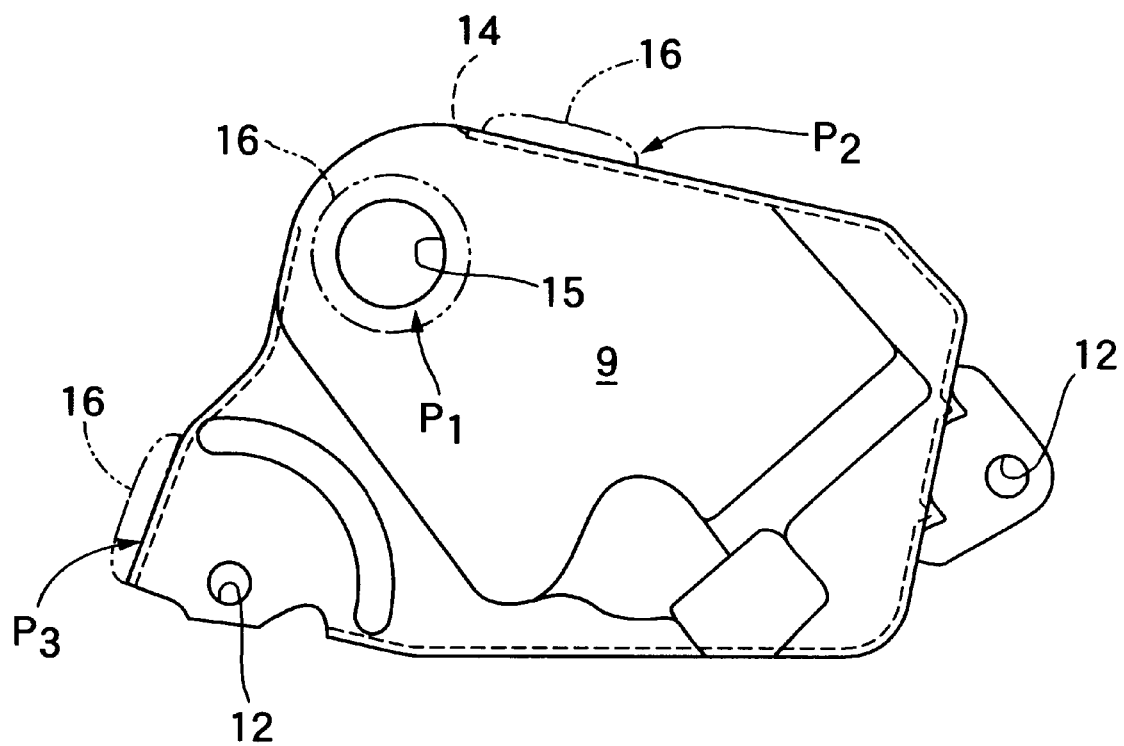

The position sensor 7 is covered with a device cover 9 made of a steel plate and shown in FIG. 3. The device cover 9 is fastened directly to the outer surface of the transmission case 5. The device cover 9 is formed by pressing into a box-like shape to cover the position sensor 7. A plurality of, e.g., two boss portions 10 are integrally provided on the transmission case 5, protruding outwards, and bolts 11 inserted through insert bores 12, provided in the device cover 9, are threadedly inserted into the boss portions 10.

A notch 14 is provided in a side of the device cover 9 for passing a lead wire 13 connected to the position sensor 7, out of the device cover 9.

To reduce the resonance sound from the device cover 9 fastened directly to the transmission case 5 in the above manner, mounting bores 15 are provided at particular positions $P_1$, $P_2$ and $P_3$ on the device cover 9, which are established, for example, at three points, and elastic members 16 having a natural frequency different from that of the device cover 9 are mounted in the mounting bores 15 to occlude the mounting bores 15. The mounting bores 15 are formed to have a diameter such that the strength and function of the entire device cover 9 are not reduced.

The elastic member 16 may be formed, for example, from rubber, substantially in correspondence to, for example, the shape of a commonly used conventional grommet. The elastic member 16 is mounted in the mounting bore 15, with a portion thereof resiliently fitted in the mounting bore 15.

Figure 4:
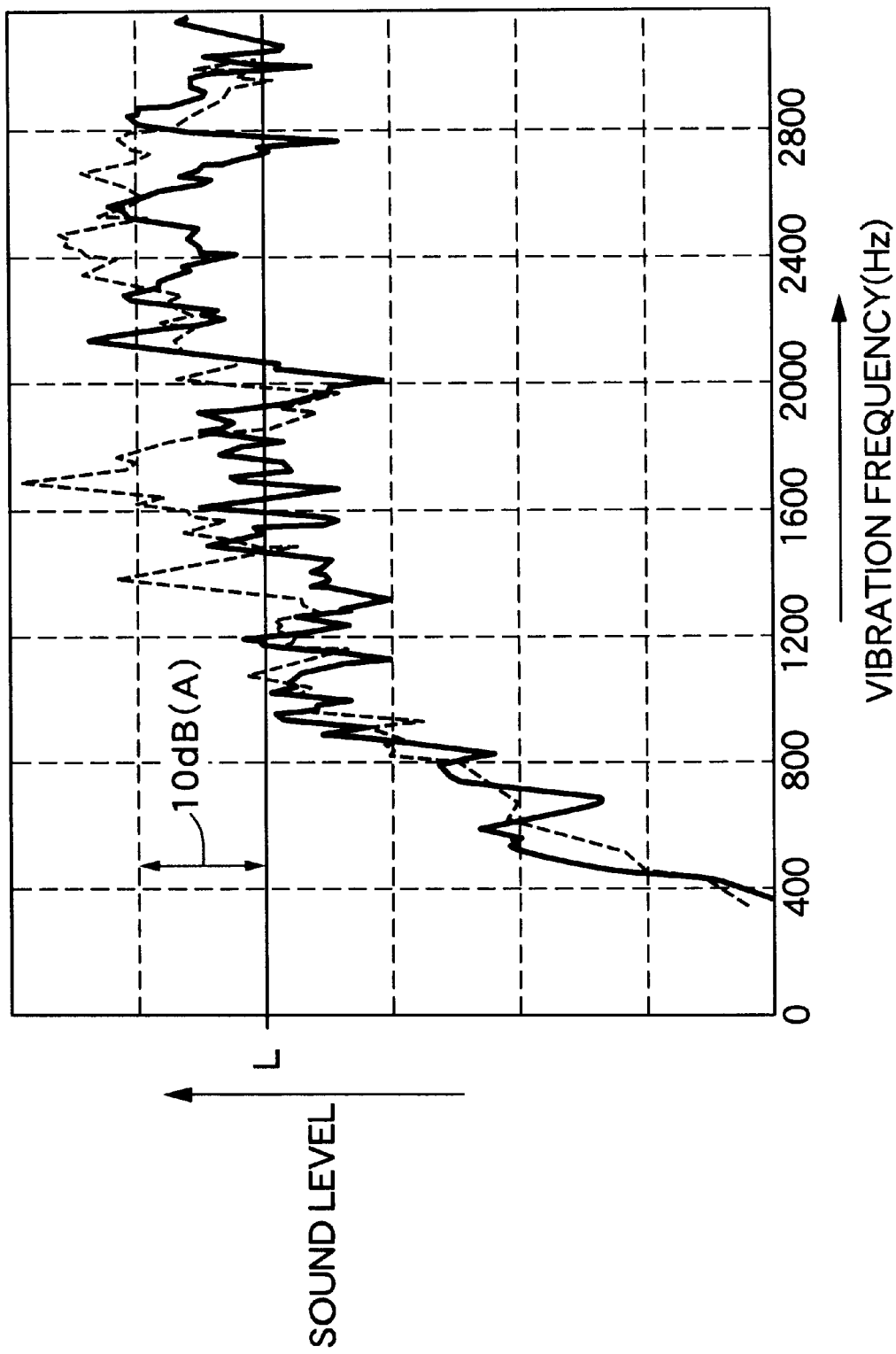
Figure 5:
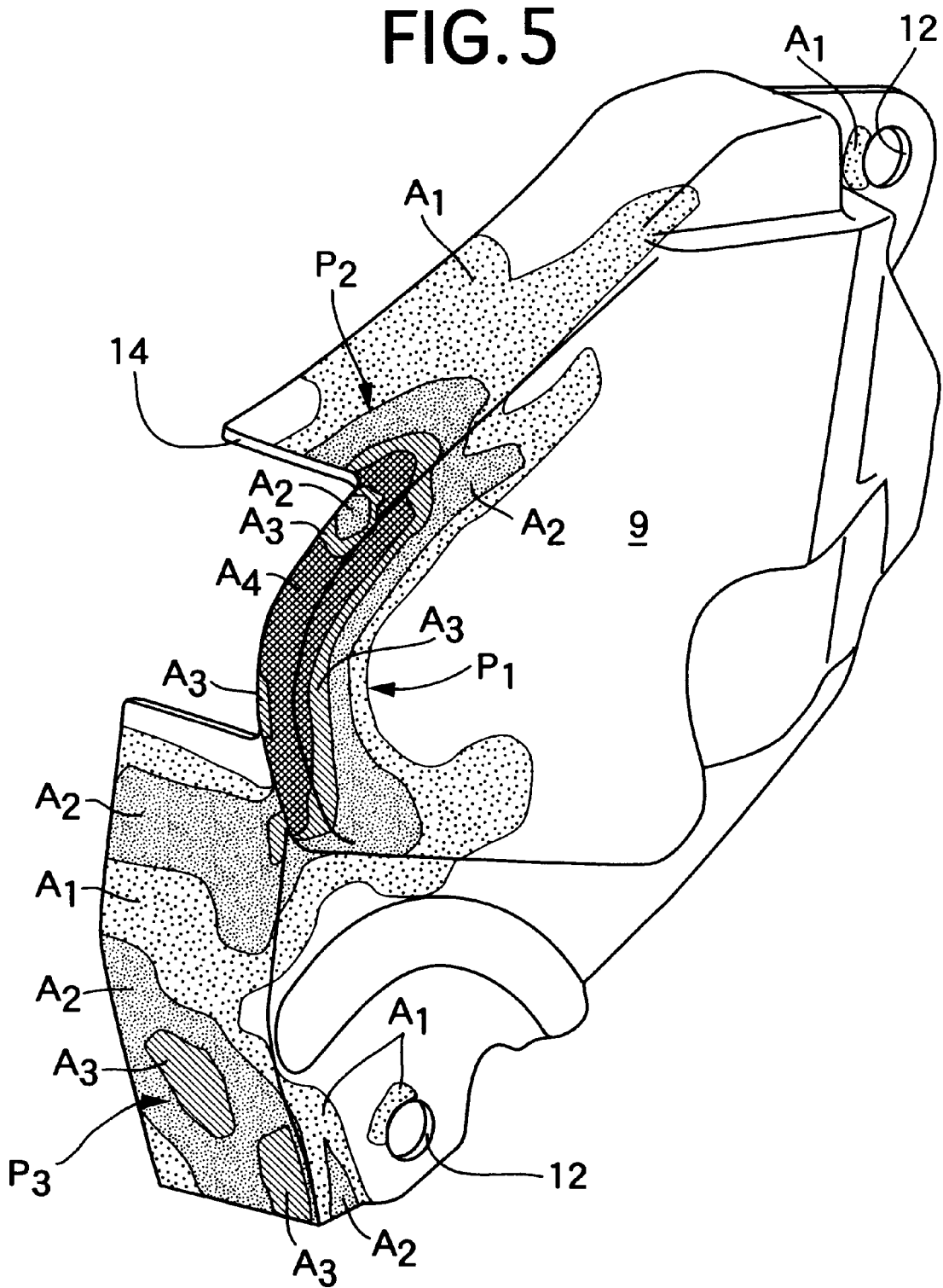

In establishing the particular positions $P_1$, $P_2$ and $P_3$, a noise measurement in an actual device is carried out in a state in which the device cover 9 having no mounting bores 15, has been fastened directly to the transmission case 5. As a result of the noise measurement, the level of vibration sound generated from the vibration of the vehicle transmission M, is provided as shown by a dashed line in FIG. 4. The level of such vibration sound is varied in accordance with the vibration frequency, and when the vibration frequency is, for example, equal to or larger than 1300 Hz, the level of the vibration sound becomes equal to or larger than a sound level L which gives rise to a problem due to the fact that a person feels the vibration sound as a noise or a displeasing sound. Namely, if the sound radiated from the device cover 9 can be reduced at a vibration frequency equal to or larger than 1300 Hz, the sound radiated from the device cover 9 can be reduced to a level where it is not a problem Therefore, if a vibration model for the device cover 9 is made, and a simulation such as a numerical analysis or the like is performed at a vibration frequency (for example, equal to or larger than 1300 Hz) which is to be reduced, the result as shown in FIG. 5 is obtained. In FIG. 5, a region having higher vibration levels is shown as being divided into four region portions $A_1$, $A_2$, $A_3$ and $A_4$ in accordance with the vibration levels. The vibration levels in the region portions $A_1$, $A_2$, $A_3$ and $A_4$ are such that $A_4 > A_3 > A_2 > A_1$. On the basis of such a simulation, the particular positions $P_1$, $P_2$ and $P_3$, for example, at three points, are determined as sites at which the vibration levels are higher than those at other sites.

With this embodiment, a relative displacement of vibration is produced at peripheral edges of the mounting bores 15 by the fact that the elastic members 16 are mounted in the mounting bores 15 provided at the particular positions $P_1$, $P_2$ and $P_3$ in the device cover 9, to close the mounting bores 15. The relative displacement of vibration is absorbed by the elastic members 16 and hence, the vibration at the particular positions $P_1$, $P_2$ and $P_3$ is suppressed or inhibited in the device cover 9.

Moreover, the particular positions $P_1$, $P_2$ and $P_3$ are determined on the basis of the simulation at a vibration frequency which is determined as being of a sound level that should be reduced by the sound measurement when the device cover 9 has been mounted directly on the transmission case 5. The generation of resonance sound in the entire device cover 9, is effectively inhibited at a vibration frequency (for example, equal to or higher than 1300 Hz) which is to be reduced, as shown by a solid line in FIG. 4, by suppression of resonance of the device cover 9 at each of the particular positions $P_1$, $P_2$ and $P_3$. In addition, since the device cover 9 may be fastened directly to the transmission case 5 with no elastic material such as a rubber, interposed therebetween, a problem does not arise in the durability of the device cover 9. Further, the strength and durability of the device cover 9 can be enhanced by enhancing the rigidity of the device cover 9 itself, by the fact that the device cover 9 is made of a steel plate.

The particular positions $P_1$, $P_2$ and $P_3$ have been determined at three points in the embodiment, but the number of the particular positions may be only one or two, or may be more than three. The material for the device cover 9 is not limited to the steel plate and may be a synthetic resin, and the elastic member 16 may be also made of a synthetic resin, if it has natural frequency different from that of the device cover 9.

Further, the present invention is not limited to the vibration inhibiting structure which is used in connection with the transmission case 5 for a vehicle transmission M, and the present invention can be widely used in connection with a device cover fastened to a casing for a vibration generating source, which covers a device mounted on the outer surface of the casing.

Although the embodiment of the present invention has been described in detail, it will be understood that the present invention is not limited to the above-described embodiment, and various modifications in design may be made without departing from the spirit and scope of the invention defined in claims.

What is claimed is:

1. A vibration inhibiting structure for a device cover which is fastened to a casing of a vibration generating source for covering a device mounted on an outer surface of said casing, said vibration inhibiting structure comprising at least one elastic member having a natural frequency different from a resonant frequency of said device cover, and at least one mounting bore formed in said device cover, wherein said elastic member is mounted in said mounting bore to close said mounting bore and wherein said device cover is fastened directly to said casing.

2. A vibration inhibiting structure for a device cover according to claim 1, wherein the mounting bore is provided at a position on the casing where a vibration level is higher than that at other sites, on the basis of a vibration frequency which is determined as being of a sound level which should be reduced, based upon noise measurement when said device cover is mounted directly on said casing.

* * * * *